United States Patent
Emura

(10) Patent No.: US 11,970,158 B2
(45) Date of Patent: Apr. 30, 2024

(54) DRIVING ASSISTANCE SYSTEM, DRIVING ASSISTANCE DEVICE, AND DRIVING ASSISTANCE METHOD FOR AVOIDANCE OF AN OBSTACLE IN A TRAVELING LANE

(71) Applicant: Panasonic Intellectual Property Management Co., Ltd., Osaka (JP)

(72) Inventor: Koichi Emura, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 675 days.

(21) Appl. No.: 17/031,688

(22) Filed: Sep. 24, 2020

(65) Prior Publication Data

US 2021/0009117 A1    Jan. 14, 2021

Related U.S. Application Data

(63) Continuation of application No. PCT/JP2019/009786, filed on Mar. 11, 2019.

(30) Foreign Application Priority Data

Mar. 26, 2018 (JP) .................. 2018-058928

(51) Int. Cl.
*B60W 50/14* (2020.01)
*B60Q 5/00* (2006.01)
(Continued)

(52) U.S. Cl.
CPC ............. *B60W 30/09* (2013.01); *B60Q 5/006* (2013.01); *B60W 30/0956* (2013.01);
(Continued)

(58) Field of Classification Search
CPC .. B60W 30/09; B60W 30/0956; B60W 30/12; B60W 50/085; B60W 50/14;
(Continued)

(56) References Cited

U.S. PATENT DOCUMENTS

| 9,212,926 B2 | 12/2015 | Attard et al. |
|---|---|---|
| 9,308,916 B2 | 4/2016 | Buerkle et al. |

(Continued)

FOREIGN PATENT DOCUMENTS

| DE | 102007015879 A1 | 10/2008 |
|---|---|---|
| DE | 102012215093 A1 | 2/2014 |

(Continued)

OTHER PUBLICATIONS

International Search Report, dated Apr. 23, 2019, for International Application No. PCT/JP2019/009786, 4 pages.

(Continued)

*Primary Examiner* — Donald J Wallace
*Assistant Examiner* — Daniel M. Robert
(74) *Attorney, Agent, or Firm* — Seed IP Law Group LLP

(57) ABSTRACT

A sensor detects an obstacle to a vehicle. An alert device provides alert information for inquiring a passenger to determine whether to continue automatic driving when a distance between the obstacle and an end of the lane is equal to or larger than a width necessary for travel based on a width of the vehicle. An input device receives a passenger's manipulation to continue automatic driving in response the inquiry provided from the alert device. A command output unit outputs a command to ease lane-based restriction on continuation of automatic driving to an automatic driving control device when the manipulation in response is received.

19 Claims, 9 Drawing Sheets

(51) Int. Cl.
*B60W 30/09* (2012.01)
*B60W 30/095* (2012.01)
*B60W 30/12* (2020.01)
*B60W 50/08* (2020.01)

(52) U.S. Cl.
CPC .......... *B60W 30/12* (2013.01); *B60W 50/085* (2013.01); *B60W 50/14* (2013.01); *B60W 2552/53* (2020.02); *B60W 2554/80* (2020.02); *B60Y 2300/18166* (2013.01)

(58) Field of Classification Search
CPC ......... B60W 2552/53; B60W 2554/80; B60W 60/0055; B60W 50/10; B60Q 5/006; G08G 1/09; G08G 1/16
See application file for complete search history.

(56) References Cited

U.S. PATENT DOCUMENTS

| | | | | |
|---|---|---|---|---|
| 10,259,459 | B2* | 4/2019 | Takae | B60W 60/0059 |
| 2011/0022317 | A1* | 1/2011 | Okita | B60W 30/12 701/301 |
| 2015/0149088 | A1 | 5/2015 | Attard et al. | |
| 2015/0210279 | A1* | 7/2015 | Agnew | B60W 60/00274 701/48 |
| 2015/0224988 | A1 | 8/2015 | Buerkle et al. | |
| 2016/0375901 | A1* | 12/2016 | Di Cairano | B60W 30/09 701/26 |
| 2017/0080952 | A1* | 3/2017 | Gupta | G08G 1/167 |
| 2017/0327111 | A1* | 11/2017 | Bonarens | B60W 50/10 |
| 2019/0202450 | A1* | 7/2019 | Maeda | B60W 10/184 |
| 2020/0164873 | A1* | 5/2020 | Nanri | G06V 20/588 |
| 2020/0353918 | A1* | 11/2020 | Goto | B60W 30/095 |

FOREIGN PATENT DOCUMENTS

| | | | |
|---|---|---|---|
| DE | 102014223275 A1 | | 5/2015 |
| DE | 102016211646 A1 | | 12/2017 |
| JP | 10-16734 A | | 1/1998 |
| JP | 2007099237 A | * | 4/2007 |
| JP | 2008-143263 A | | 6/2008 |
| JP | 2012/128748 A | | 7/2012 |
| JP | 2012128748 A | * | 7/2012 |
| JP | 2017/185922 A | | 10/2017 |

OTHER PUBLICATIONS

German Office Action dated Dec. 5, 2023, for the corresponding German Patent Application No. 112019001620.2, 14 pages. (With English Translation).

* cited by examiner

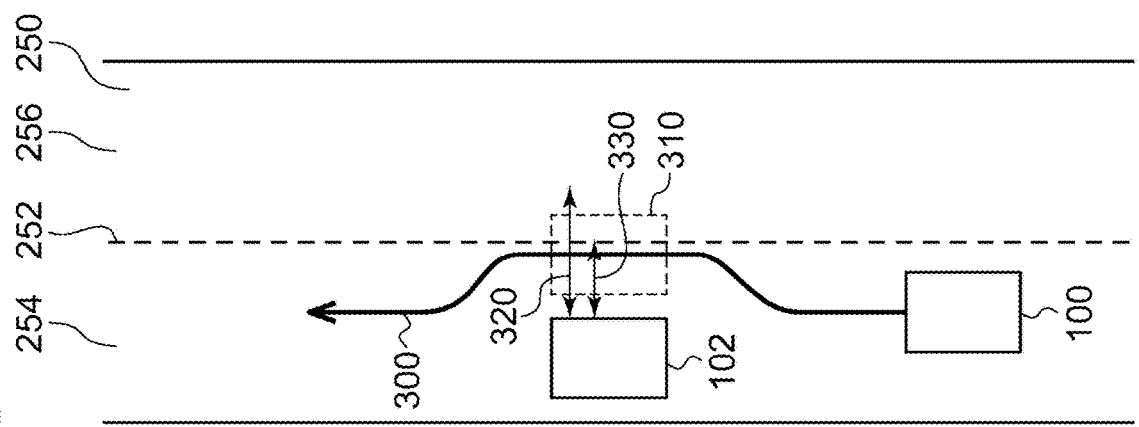
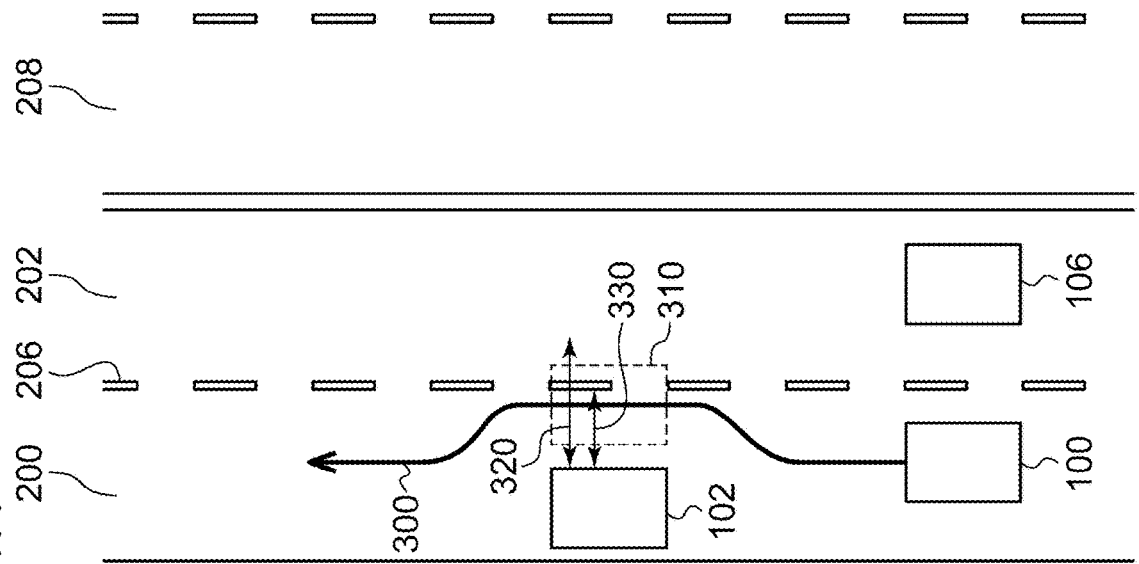

DRIVING ASSISTANCE SYSTEM, DRIVING ASSISTANCE DEVICE, AND DRIVING ASSISTANCE METHOD FOR AVOIDANCE OF AN OBSTACLE IN A TRAVELING LANE

CROSS-REFERENCE TO RELATED APPLICATION

This application is based upon and claims the benefit of priority from the prior Japanese Patent Application No. 2018-058928, filed on Mar. 26, 2018, the entire contents of which are incorporated herein by reference.

BACKGROUND

Technical Field

The present disclosure relates to a driving assistance technology, and, more particularly, to a driving assistance system, a driving assistance device, a driving assistance method.

Description of the Related Art

In automatic driving of a vehicle, an obstacle to vehicle travel is sensed, and the vehicle is automatically stopped at a certain distance before the obstacle. For optimally controlling a vehicle traveling at a low to high speed to stop automatically, an obstacle sensing means for long distance that senses whether an obstacle is present within a long-distance range and an obstacle sensing means for short distance that identifies a distance to a sensed obstacle only within a range of short distance (see, for example, patent document 1).
[Patent Literature 1] JP10-16734

A vehicle driven automatically continues automatic driving if the vehicle can keep traveling within a lane to avoid a parked vehicle or to overtake a leading motorcycle or bicycle. If a vehicle cannot keep traveling within a lane and should pull out to the oncoming lane, it is necessary, for avoidance or overtake, to detect an obstacle beyond a parked vehicle or an obstacle farther ahead of a leading motorcycle or bicycle and to determine whether it is possible to return to the original lane after pulling out of the lane. However, this is generally difficult so that the vehicle will stop or follow a leading motorcycle or bicycle. Thus, convenience is seriously impeded if the vehicle stops temporarily every time a parked vehicle is detected, forcing the passenger to switch to manual driving, of if the vehicle follows a slowly moving motorcycle, etc., every time a leading motorcycle or bicycle is detected.

BRIEF SUMMARY

The present disclosure addresses the above-described issue, and a general purpose thereof is to provide a technology to enable traveling in accordance with a situation even when an obstacle is present.

A driving assistance system according to an embodiment of the present disclosure is a driving assistance system for supporting a vehicle, the vehicle including a sensor for detecting an obstacle to the vehicle and an automatic driving control device for calculating an avoidance path for avoiding the obstacle detected by the sensor, controlling automatic driving of the vehicle by referring to the avoidance path calculated, and allowing automatic driving to continue by avoiding the obstacle within a lane, the driving assistance system including: an alert device that provides alert information for inquiring a passenger to determine whether to continue automatic driving when a distance between the obstacle and an end of the lane is equal to or larger than a width necessary for travel based on a width of the vehicle; an input device that receives a passenger's manipulation to continue automatic driving in response the inquiry provided from the alert device; and a command output unit that outputs a command to ease lane-based restriction on continuation of automatic driving to the automatic driving control device when the manipulation in response is received by the input device.

Another embodiment of the present disclosure relates to a driving assistance device. The device is a driving assistance device for supporting a vehicle, the vehicle including an automatic driving control device for calculating an avoidance path for avoiding an obstacle detected by a sensor for detecting an obstacle to the vehicle, controlling automatic driving of the vehicle by referring to the avoidance path calculated, and allowing automatic driving to continue by avoiding the obstacle within a lane, the driving assistance system including: an inquiry output unit that provides, to an alert device, inquiry information for inquiring a passenger to determine whether to continue automatic driving when a distance between the obstacle and an end of the lane is equal to or larger than a width necessary for travel based on a width of the vehicle; a manipulation signal input unit in which a response signal for a passenger's manipulation to continue automatic driving is input in response to the inquiry provided by the alert device; and a command output unit that outputs a command to ease lane-based restriction on continuation of automatic driving to the automatic driving control device when the response signal is input to the manipulation signal input unit.

Another embodiment of the present disclosure relates to a driving assistance method. The method is a driving assistance method adapted for a driving assistance device for supporting a vehicle, the vehicle including an automatic driving control device for calculating an avoidance path for avoiding an obstacle detected by a sensor for detecting an obstacle to the vehicle, controlling automatic driving of the vehicle by referring to the avoidance path calculated, and allowing automatic driving to continue by avoiding the obstacle within a lane, the driving assistance method comprising: providing, to an alert device, inquiry information for inquiring a passenger to determine whether to continue automatic driving when a distance between the obstacle and an end of the lane is equal to or larger than a width necessary for travel based on a width of the vehicle; inputting a response signal for a passenger's manipulation to continue automatic driving in response to the inquiry provided by the alert device; and outputting a command to ease lane-based restriction on continuation of automatic driving to the automatic driving control device when the response signal is input.

Optional combinations of the aforementioned constituting elements, and implementations of the present disclosure in the form of devices, systems, methods, programs, recording mediums having programs recorded thereon, and vehicles carrying the device may also be practiced as additional modes of the present disclosure.

BRIEF DESCRIPTION OF THE SEVERAL VIEWS OF THE DRAWINGS

Embodiments will now be described, by way of example only, with reference to the accompanying drawings that are meant to be exemplary, not limiting, and wherein like elements are numbered alike in several figures, in which:

FIGS. 7A and 7B show an outline of an alternative process according to the embodiment;

DETAILED DESCRIPTION

Figure 1:
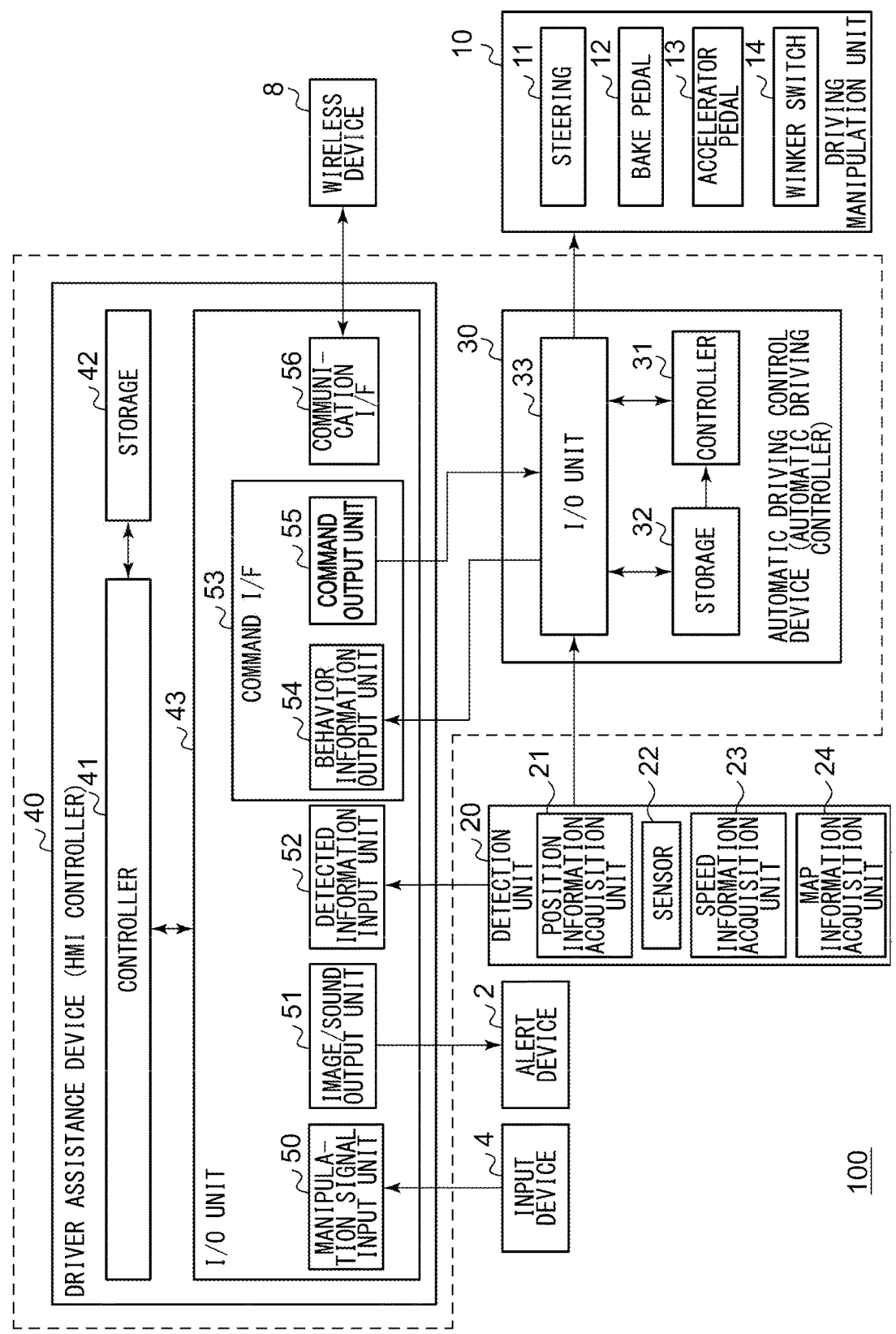
FIG. 1 shows a configuration of a vehicle according to the embodiment.

The invention will now be described by reference to the preferred embodiments. This does not intend to limit the scope of the present invention, but to exemplify the invention.

A brief summary will be given before describing the present disclosure in specific details. An embodiment relates to a vehicle that calculates a possibility of collision with a detected obstacle and performs automatic driving by referring to the possibility of collision thus calculated for determination. In particular, the embodiment relates to a device (hereinafter, also referred to as "driving assistance device") for controlling the human machine interface (HMI) for exchanging information related to the driving behavior of a vehicle with a passenger on the vehicle. "Driving behavior" includes operating conditions of steering or braking occurring while the vehicle is traveling or at a stop, or details of control related to automatic driving. For example, the driving behavior is exemplified by constant speed running, acceleration, deceleration, temporary stop, stop, lane change, route change, right or left turn, parking, etc. Alternatively, the driving behavior may be cruising (staying in a lane and maintaining a vehicle speed), staying in a lane, following a leading vehicle, stop-and-go performed while following a vehicle, lane change, overtake, responding to a merging vehicle, interchange including entry into and exit from an expressway, merging, responding to a construction zone, responding to an emergency vehicle, responding to an interrupting vehicle, responding to a lane exclusive for right or left turn, interaction with a pedestrian/bicycle, avoidance of an obstacle other than a vehicle, responding to a sign, responding to right or left turn/U-turn restriction, responding to lane restriction, responding to one-way traffic, responding to a traffic sign, or responding to an intersection/roundabout.

When an obstacle is present near the passenger's vehicle during a driving behavior of traveling on a lane, the automatic driving control device calculates a possibility of collision with the obstacle. When the possibility of collision exceeds a predetermined value, the automatic driving control device avoids the obstacle within the lane and continues automatic driving. The obstacle may be, for example, a parked vehicle or a leading motorcycle or bicycle. In the case the vehicle should pull out to the oncoming lane to avoid a parked vehicle, a vehicle that is being automatically driven may stop before the parked vehicle. In this case, the vehicle may wait for the parked vehicle to start or may switch to manual driving. Further, even when a manipulation to pull out of the lane and continue automatic driving in order to avoid a leading motorcycle or bicycle or to avoid a parked vehicle is received from a passenger, it is suitable to halt the manipulation from the passenger and to issue a command for temporary stop or the like and to alert the passenger that the manipulation from the passenger is halted and temporary stop is performed, if there is a further vehicle moving in the oncoming lane to approach the passenger's vehicle or there is a change in the movement of the parked vehicle or the leading vehicle that is moving and so there is a possibility of collision.

The driving assistance device according to the embodiment inquires the passenger to determine whether to stop the vehicle or pull out of the lane and continue automatic driving if the vehicle will pull out of the lane by traveling along a path for avoiding the detected obstacle (hereinafter, "avoidance path"). For example, an image for inquiry is generated and displayed on the monitor in the vehicle. When a manipulation to continue is received from the passenger in response to the inquiry, the driving assistance device generates a command to ease lane-based restriction on continuation of automatic driving and outputs the command to the automatic driving control device. When the automatic driving control device receives the command from the driving assistance device, the automatic driving control device causes the vehicle to pull out of the lane and continue automatic driving, provided that the possibility of collision predicted to occur when the lane is ignored is smaller than a predetermined value.

The embodiment of the present disclosure will now be described in detail with reference to the drawings. The embodiment described below is by way of example only, and the present disclosure is not limited by the embodiment.

FIG. 1 shows a configuration of a vehicle 100 according to the embodiment and particularly show a configuration related to an automatically driven vehicle. The vehicle 100 can travel in an automatic driving mode and includes an alert device 2, an input device 4, a wireless device 8, a driving manipulation unit 10, a detection unit 20, an automatic driving control device 30, and a driving assistance device 40. The devices shown in FIG. 1 may be connected by dedicated cables or connected by wire communication such as a controller area network (CAN). Alternatively, the devices may be connected by cable communication or wireless communication such as universal serial bus (USB), Ethernet (registered trademark), Wi-Fi (registered trademark), and Bluetooth (registered trademark).

The alert device 2 alerts the passenger of information related to travel of the vehicle 100. The alert device 2 is, for example, a car navigation system, a head-up display, or a center display mounted in the vehicle. The alert device 2 may be a display unit for displaying information such as a light emitting body (e.g., a light emitting diode) mounted in a steering wheel, in a pillar, in a dashboard, or around a meter panel. Alternatively, the alert device 2 may be a speaker that converts information into sound so as to alert the passenger accordingly. Still alternatively, the alert device 2 may be a vibrating body provided at a position that can be sensed by the passenger (e.g., the passenger's seat, the steering wheel, etc.). Still alternatively, the alert device 2 may be a combination of the above examples.

The input device 4 is a user interface device that receives an input for manipulation by the passenger. For example, the input device 4 is a touch panel, a lever, a button, a switch, a controller like a joystick or a volume, a sensor like a camera capable of recognizing a gesture in a contactless manner, a sensor like a microphone capable of recognizing sound, or a combination of these. The input device 4 receives information related to automatic driving of the passenger's vehicle entered by the passenger. Alternatively, the input device 4 may receive a manipulation signal for switching between automatic driving and manual driving. The input device 4 outputs the received information to the driving assistance device 40 as a manipulation signal.

Figure 2:
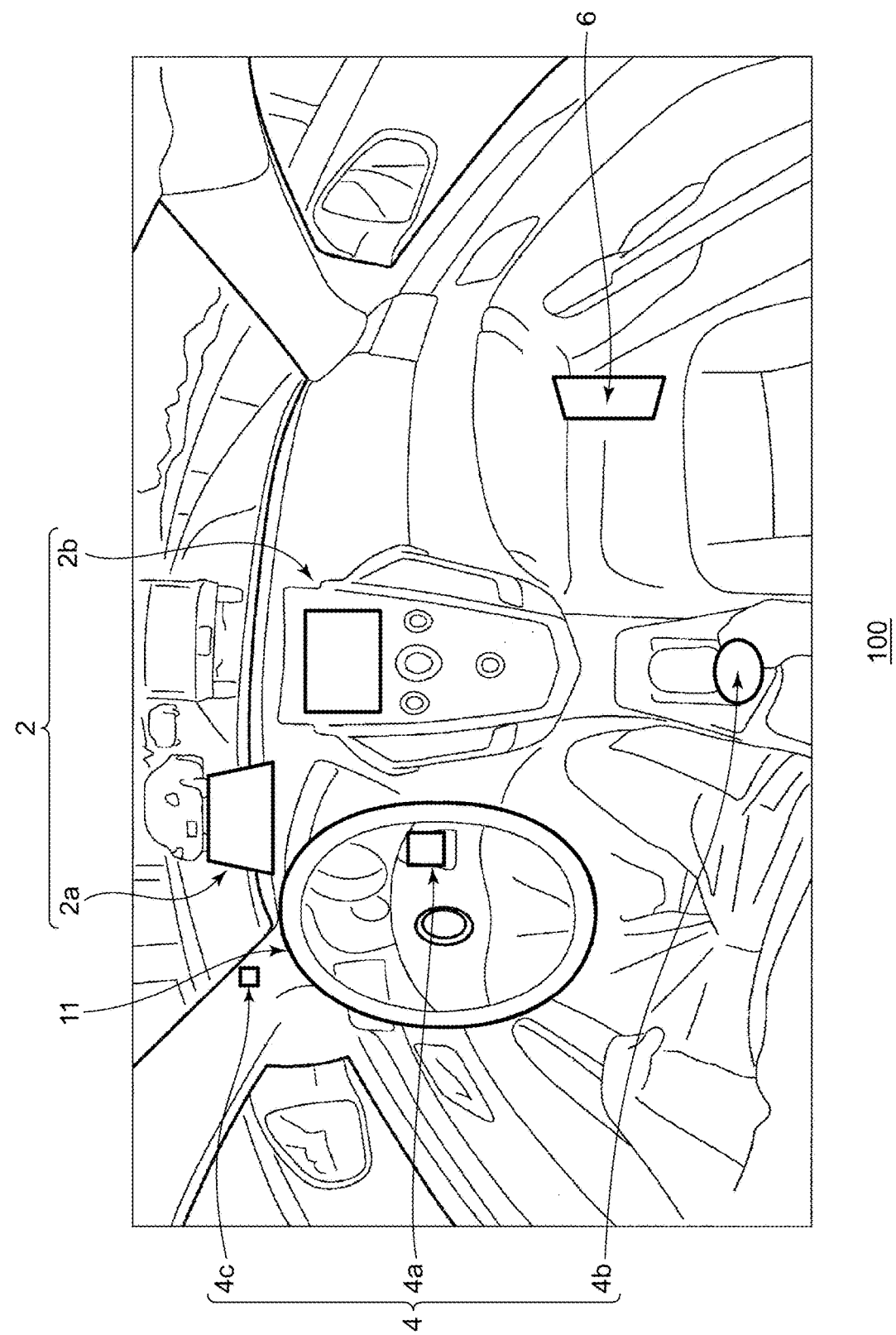
FIG. 2 schematically shows the interior of the vehicle of FIG. 1.

FIG. 2 schematically shows the interior of the vehicle 100. The alert device 2 may be a head-up display (HUD) 2a or a center display 2b. The input device 4 may be a first manipulation unit 4a provided in the steering 11, a second manipulation unit 4b provided between the driver's seat and the front passenger's seat, or a third manipulation unit 4c that is a sensor like a camera for recognizing a gesture. The alert device 2 and the input device 4 may be integrated and may be implemented as a touch-sensitive display. The vehicle 100 may further be provided with a speaker 6 that presents information related to automatic driving to the passenger in the form of sound. In this case, the driving assistance device 40 may cause the alert device 2 to display an image indicating information related to automatic driving, and, additionally or alternatively, may cause the speaker 6 to output sound indicating information related to automatic driving. Reference is made back to FIG. 1.

The wireless device 8 is compatible with a cellular phone communication system, a wireless metropolitan area network (WMAN), etc., and performs wireless communication with a data server, infrastructure, further vehicles, pedestrians, etc. The driving manipulation unit 10 includes a steering 11, a brake pedal 12, an accelerator pedal 13, and a winker switch 14. The steering 11, the brake pedal 12, the accelerator pedal 13, the winker switch 14 are subject to electronic control by a steering ECU, a brake ECU, an engine ECU and a motor ECU, and a winker controller, respectively. In an automatic driving mode, the steering ECU, the brake ECU, the engine ECU, and the motor ECU drive an actuator in accordance with a control signal supplied from the automatic driving control device 30. The winker controller turns the winker lamp on or off in accordance with a control signal supplied from the automatic driving control device 30.

The detection unit 20 detects the situation around and the traveling condition of the vehicle 100. For example, the detection unit 20 detects the speed of the vehicle 100, the speed of the leading vehicle relative to the vehicle 100, the distance between the vehicle 100 and the leading vehicle, the speed of the vehicle in the adjacent lane relative to the vehicle 100, the distance between the vehicle 100 and the vehicle in the adjacent lane, and the position information on the vehicle 100. The detection unit 20 outputs various information detected (hereinafter, referred to as "detected information") to the automatic driving control device 30. Alternatively, the detection unit 20 may output the detected information to the driving assistance device 40 via the automatic driving control device 30 or directly output the detected information to the driving assistance device 40. The detection unit 20 includes a position information acquisition unit 21, a sensor 22, a speed information acquisition unit 23, and a map information acquisition unit 24.

The position information acquisition unit 21 acquires the current position of the vehicle 100 from a global navigation satellite system(s) (GNSS) receiver. The sensor 22 is a generic term for sensors that detect the situation outside the vehicle and the condition of the vehicle 100. The sensor mounted to detect the situation outside the vehicle is exemplified by a camera, a millimeter radar, light detection ranging, laser imaging detection and ranging (LIDAR), a sonar, a temperature sensor, an atmospheric pressure sensor, a humidity sensor, an illuminance sensor, etc. The situation outside the vehicle is exemplified by the condition, including the lane information, of the road that the user's vehicle is traveling on, the environment including the weather, the situation surrounding the user's vehicle, and further vehicles located in nearby positions (other vehicles traveling on adjacent lanes, etc.). The other vehicles may be defined as obstacles. In the following description, obstacles may be referred to as further vehicles. Any information outside the vehicle that can be detected by the sensor 22 will be included. The sensor 22 for detecting the condition of the vehicle 100 is exemplified by an acceleration sensor, a gyro sensor, a geomagnetic sensor, an inclination sensor, etc.

The speed information acquisition unit 23 acquires the current speed of the vehicle 100 from the vehicle speed sensor. The map information acquisition unit 24 acquires map information around the current position of the vehicle 100 from a map database. The map database may be recorded in a recording medium in the vehicle 100 or downloaded from a map server before use via a network. The map information includes information on roads and intersections.

The automatic driving control device 30 is an automatic driving controller implementing automatic driving control functions and determines the behavior of the vehicle 100 in automatic driving. The automatic driving control device 30 includes a controller 31, a storage 32, an I/O unit (input/output unit) 33. The configuration of the controller 31 can be realized by cooperation of hardware resources and software resources or only by hardware resources. A processor, read only memory (ROM), random access memory (RAM), and other LSIs can be used as hardware resources, and programs like an operating system, application, firmware, etc., can be used as software resources. The storage 32 includes a non-volatile recording medium such as a flash memory. The I/O unit 33 performs communication control compatible with various communication formats. For example, the I/O unit 33 outputs information on automatic parking to the driving assistance device 40 and receives a control command from the driving assistance device 40. Further, the I/O unit 33 receives the detected information from the detection unit 20.

The controller 31 applies the control command input from the driving assistance device 40 and various information collected from the detection unit 20 or various ECUs to an automatic driving algorithm and calculates control values for controlling a subject of automatic control such as the accelerator throttle position and steering angle of the vehicle 100. To describe control for stopping the vehicle 100 by way of one example, the controller 31 calculates, in the case that the detected obstacle is a further vehicle, time-to-collision (TTC) with the further vehicle as follows as indicating the possibility of collision, based on the detected information received from the detection unit 20.

$$TTC=D/(V2-V1)$$

where D denotes an inter-vehicular distance to the further vehicle, V1 denotes the speed of the vehicle 100, and V2 denotes the speed of the further vehicle. That the TTC becomes smaller means that the time before a collision becomes shorter and is equivalent to greater possibility of collision.

When the obstacle is a person, on the other hand, the controller 31 calculates the possibility of collision according to whether there is a person in an area (hereinafter, "monitored area") formed around the vehicle 100 and varying depending on the driving behavior. The possibility of collision is small if there is not any person, and the possibility of collision is great if there is a person. Regardless of whether the obstacle is a further vehicle or a person, the controller 31 determines to stop the vehicle 100 as part of automatic driving control and calculates a control value for stopping the vehicle 100, if the possibility of collision is greater than a predetermined value. In other words, the controller 31 subjects the vehicle 100 automatic driving control by using the possibility of collision for determination. The predetermined value may vary depending on whether the obstacle is a further vehicle or a person. In the case there are a plurality of obstacles, the controller 31 determines to stop the vehicle 100 when the possibility of collision with at least one obstacle is greater than a predetermined value. The controller 31 transmits the calculated control values to the ECU or the controller for the respective subjects of control. In this embodiment, the control values are transmitted to the steering ECU, brake ECU, engine ECU, and winker controller. In the case of electric vehicles or hybrid vehicles, the control value is transmitted to the motor ECU in place of or in addition to the engine ECU.

The driving assistance device 40 is an HMI controller for interfacing between the vehicle 100 and the passenger and includes a controller 41, a storage 42, and an I/O unit 43. The controller 41 performs various data processes such as HMI control. The controller 41 can be realized by cooperation of hardware resources and software resources or only by hardware resources. A processor, ROM, RAM, and other LSIs can be used as hardware resources, and programs like an operating system, application, firmware, etc., can be used as software resources.

The storage 42 is a storage area for storing data referred to or updated by the controller 41. For example, the storage 42 is realized by a non-volatile recording medium such as a flash memory. The I/O unit 43 performs communication control compatible with various communication formats. The I/O unit 43 includes a manipulation signal input unit 50, an image/sound output unit 51, a detected information input unit 52, a command interface (IF) 53, and a communication IF 56.

The manipulation signal input unit 50 receives, from the input device 4, a manipulation signal responsive to a user operation performed by the passenger or the user outside the vehicle in the input device 4, and outputs the manipulation signal to the controller 41. The image/sound output unit 51 outputs image data or a sound message generated by the controller 41 to the alert device 2, causing the alert device 2 to present the image data or the sound message. The detected information input unit 52 receives, from the detection unit 20, the detected information representing a result of detection by the detection unit 20 and indicating the current situation around and driving condition of the vehicle 100, and outputs the detected information to the controller 41.

The command IF 53 performs interfacing with the automatic driving control device 30 and includes a behavior information input unit 54 and a command output unit 55. The behavior information input unit 54 receives information on the vehicle 100 transmitted from the automatic driving control device 30 and relating to automatic parking and outputs the information to the controller 41. The command output unit 55 receives a control command designating a mode of automatic parking to the automatic driving control device 30 from the controller 41 and transmits the control command to the automatic driving control device 30.

The communication IF 56 performs interfacing with the wireless device 8. The communication IF 56 transmits the data output from the controller 41 to the wireless device 8 and causes the wireless device 8 to transmit the data to a device outside the vehicle. Further, the communication IF 56 receives data from a device outside the vehicle transferred from the wireless device 8 and outputs the data to the controller 41.

It should be noted here that the automatic driving control device 30 and the driving assistance device 40 are configured as separate devices. In one variation, the automatic driving control device 30 and the driving assistance device 40 may be integrated in one controller as indicated by the broken line of FIG. 1. In other words, a single automatic driving control device may be configured to include the functions of both of the automatic driving control device 30 and the driving assistance device 40 of FIG. 1. Still alternatively, the automatic driving control device may be configured as a driving assistance system in which the input device 4, the detection unit 20, and the driving assistance device 40 are combined.

Figure 3A:
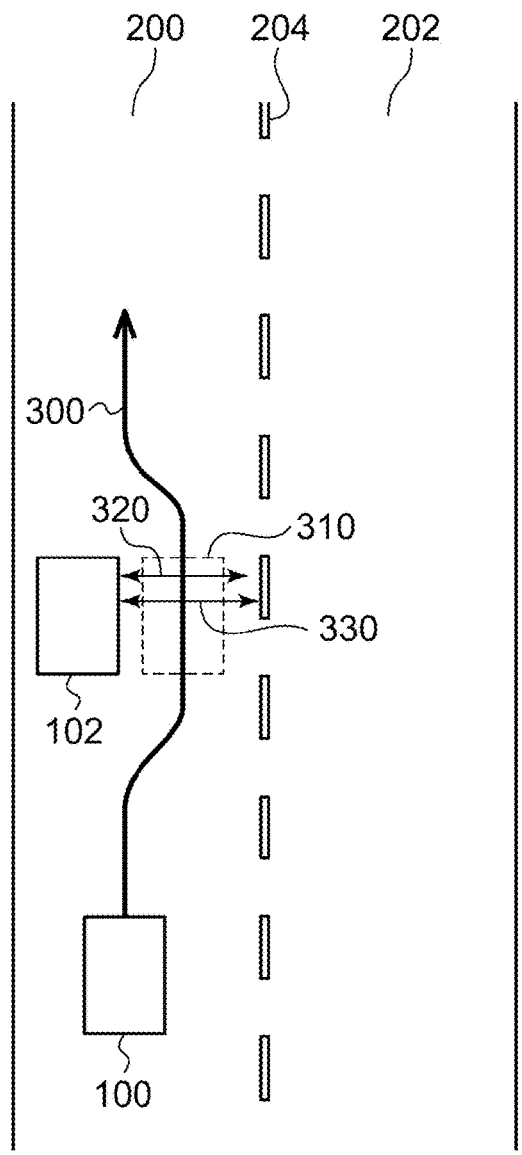
FIGS. 3A and 3B show an outline of the process according to the embodiment.
Figure 3B:
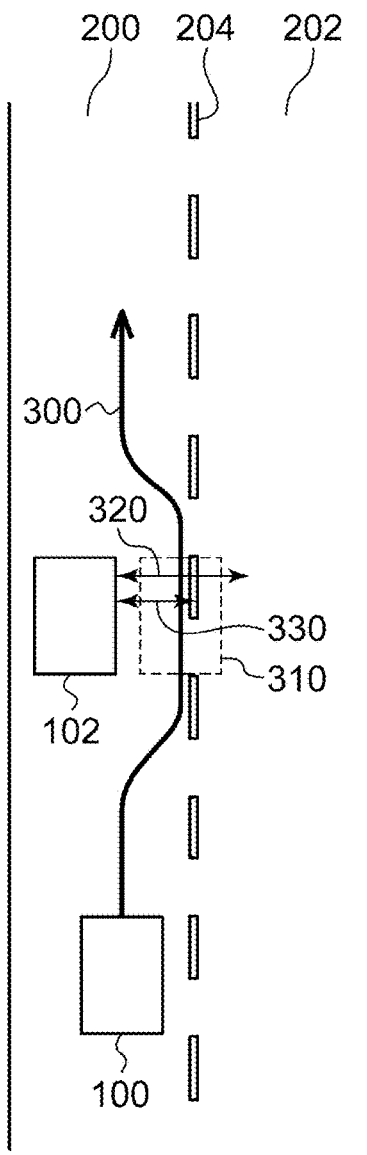

FIGS. 3A-3B will also be used to explain the driving behavior to "avoid an obstacle detected while the vehicle is traveling on lane." FIGS. 3A-3B show an outline of the process according to the embodiment. FIGS. 3A-3B show a road in which a first lane 200 and a second lane 202 are arranged, bounded by a compartment line 204. The first lane 200 has a upward direction of travel, and the second lane 202 has a downward direction of travel so that the first lane 200 and the second lane 202 have mutually opposite directions of travel. FIGS. 3A-3B differ in the width of the first lane 200 and the second lane 202. The width of the first lane 200 and the second lane 202 in FIG. 3B is smaller than the width of the first lane 200 and the second lane 202 in FIG. 3A.

Referring to FIG. 3A, the vehicle 100 automatically driven by the automatic driving control device 30 is traveling on the first lane 200. In the direction of travel of the vehicle 100, a parked vehicle 102 is located on the left end of the first lane 200. The sensor 22 of FIG. 1 detects the obstacle to the vehicle 100, i.e., the parked vehicle 102, in the direction in which the vehicle 100 travels along the first lane 200. For detection of the parked vehicle 102, a publicly known technology may be used, and a description thereof is omitted. The detection unit 20, which includes the sensor 22, outputs detected information including information on the parked vehicle 102 thus detected to the automatic driving control device 30 and the driving assistance device 40. The detected information also includes the current position of the vehicle 100 acquired by the position information acquisition unit 21, the current speed of the vehicle 100 acquired by the speed information acquisition unit 23, and the map information from the map information acquisition unit 24.

When the I/O unit 33 of the automatic driving control device 30 receives the detected information from the sensor 22, the controller 31 calculates the TTC for the parked vehicle 102 as indicating the possibility of collision, by referring to the inter-vehicular distance between the vehicle 100 and the parked vehicle 102 in the detected information and on the current speed of the vehicle 100. When the possibility of collision is greater than a predetermined value, the controller 31 should determine to stop the vehicle. In that process, the controller 31 generates an avoidance path 300 to avoid the parked vehicle 102 that is the obstacle by referring to the detected information. Specifically, the avoidance path 300 is generated such that, given that one end (e.g., the left end) of a width necessary for travel 320, derived from adding a certain margin to the width of the vehicle 100, is provided to touch the side surface of the parked vehicle 102, the vehicle 100 travels at the center of the width necessary for travel 320. When the vehicle 100 travels along the avoidance path 300 configured as described above, the vehicle 100 does not collide with the parked vehicle 102. The vehicle 100 side by side with the parked vehicle 102 is illustrated as a virtual vehicle 310.

Further, the distance between the side surface of the parked vehicle 102 toward the compartment line 204 and the compartment line 204 at the end of the first lane 200 is derived as a first lane space distance 330. The compartment line 204 may be detected from an image captured by a camera or may be recognized from the map information. The controller 31 compares the width necessary for travel 320 and the first lane space distance 330. When the first lane space distance 330 is larger than the width necessary for travel 320 as shown in FIG. 3A, the controller 31 determines to continue automatic driving along the avoidance path 300. This represents a situation in which the width of the first lane 200 is large so that, even if the vehicle 100 travels along the avoidance path 300, the vehicle 100 will not pull out to the second lane 202 and travel by avoiding the parked vehicle 102 within the first lane 200.

FIG. 3B also shows that the parked vehicle 102 is located on the left end of the first lane 200 in the direction of travel of the vehicle 100. The detection unit 20 and the automatic driving control device 30 of FIG. 1 perform the same process as mentioned above. Thus, the controller 31 compares the width necessary for travel 320 and the first lane space distance 330. When the first lane space distance 330 is equal to or smaller than the width necessary for travel 320 as shown in FIG. 3B, the controller 31 determines to stop the vehicle 100 before the parked vehicle 102. In other words, continuation of automatic driving is restricted by the lane. This represents a situation in which the width of the second lane 202 is small so that the vehicle 100 will pull out to the second lane 202 if the vehicle 100 travels along the avoidance path 300.

Figure 4:
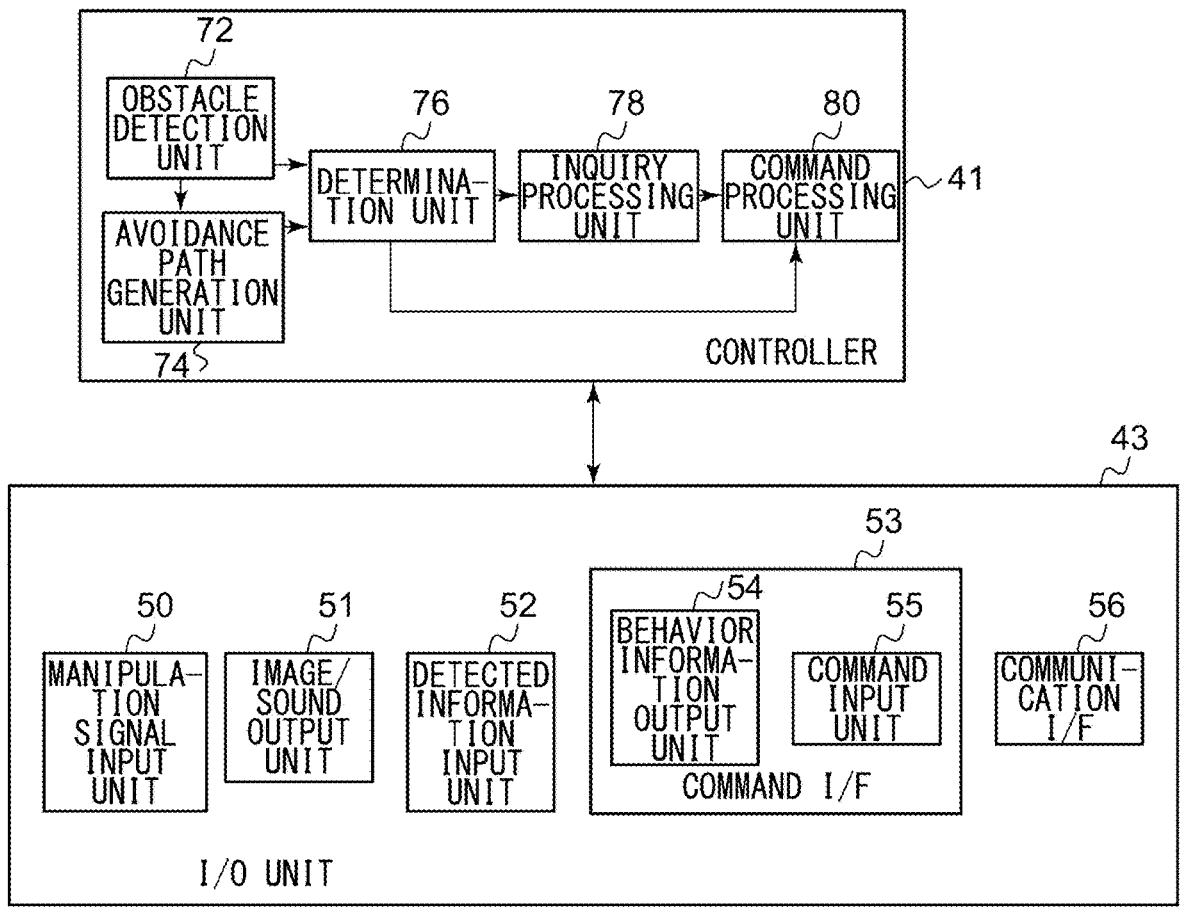
FIG. 4 shows a configuration of the driving assistance device of FIG. 1.

Even in the case like that of FIG. 3B, however, it does not matter if the vehicle 100 continues automatic driving to pull out to the second lane 202 and travel on the avoidance path 300, provided that a further vehicle, i.e., an oncoming vehicle, is not traveling on the second lane 202. To realize such continuation of automatic driving, the driving assistance device 40 performs the following process. FIG. 4 will be used to describe the process. FIG. 4 shows a configuration of the driving assistance device 40. The controller 41 includes an obstacle detection unit 72, an avoidance path generation unit 74, a determination unit 76, an inquiry processing unit 78, and a command processing unit 80.

A detected information input unit 52 receives detected information from the detection unit 20. As described above, the detected information includes the information on the parked vehicle 102, the current position of the vehicle 100, the current speed of the vehicle 100, and the map information. The detected information input unit 52 outputs the detected information to the controller 41. The obstacle detection unit 72 of the controller 41 receives the detected information and recognizes the presence of the parked vehicle 102 based on the detail of the detected information. This represents detection of the obstacle to the vehicle 100. The obstacle detection unit 72 outputs the information related to the parked vehicle 102 (e.g., the position of the parked vehicle 102 relative to the vehicle 100) to the avoidance path generation unit 74 and the determination unit 76.

The avoidance path generation unit 74 receives the information on the parked vehicle 102 from the obstacle detection unit 72. Further, the avoidance path generation unit 74 receives the current position of the vehicle 100 included in the detected information and the map information. The avoidance path generation unit 74 generates the avoidance path 300 to avoid the parked vehicle 102 that is the obstacle by referring to the received information. The avoidance path 300 may be generated as it is generated in the controller 31, and a description thereof is omitted. For clarity of the description, it is assumed that the avoidance path 300 generated by the avoidance path generation unit 74 and the avoidance path 300 generated by the controller 31 are identical, but the paths may be different. The avoidance path generation unit 74 outputs information related to the avoidance path 300 to the determination unit 76.

The determination unit 76 receives the information related to the parked vehicle 102 from the obstacle detection unit 72 and also receives the information related to the avoidance path 300 from the avoidance path generation unit 74. Like the controller 31, the determination unit 76 compares the width necessary for travel 320 on the avoidance path 300 with the first lane space distance 330. When the first lane space distance 330 is larger than the width necessary for travel 320, the determination unit 76 determines to continue automatic driving along the avoidance path 300. This is equivalent to the case of FIG. 3A. Automatic driving is continued by the automatic driving control device 30 so that the determination unit 76 terminates the process. When the first lane space distance 330 is equal to or smaller than the width necessary for travel 320, on the other hand, the determination unit 76 directs the inquiry processing unit 78 to make an inquiry. This is equivalent to the case of FIG. 3B, where the vehicle 100 is about to be stopped by the automatic driving control device 30.

Figure 5A:
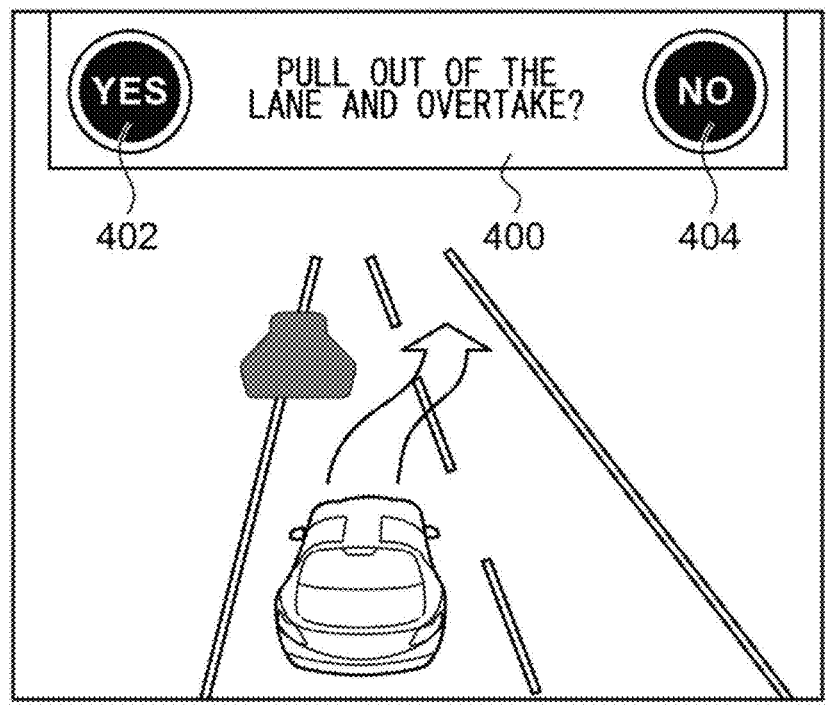
FIGS. 5A and 5B show images displayed on the alert device of FIG. 2.
Figure 5B:
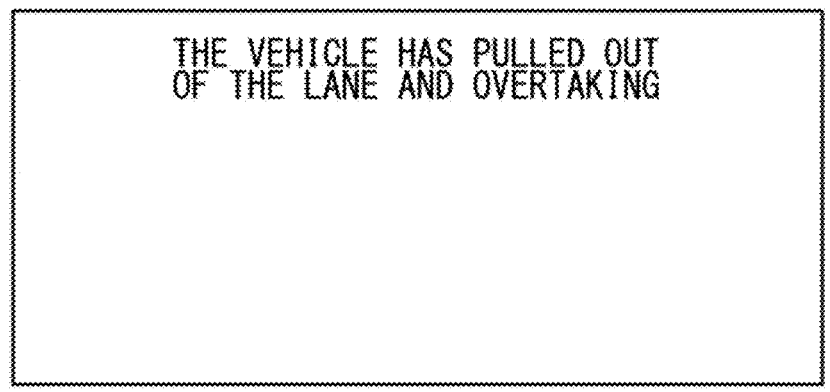

When the inquiry processing unit 78 is directed by the determination unit 76 to make an inquiry, the inquiry processing unit 78 performs a process of inquiring the passenger to determine whether to continue automatic driving. Specifically, the inquiry processing unit 78 outputs, as inquiry information, an image for inquiring the passenger to determine whether to continue automatic driving to the image/sound output unit 51. The image/sound output unit 51 outputs the image as inquiry information to the alert device 2. Therefore, the image/sound output unit 51 can be said to be an inquiry output unit. The alert device 2 displays the image as inquiry information. FIGS. 5A-5B show images displayed on the alert device 2. In particular, FIG. 5A shows an image generated in the inquiry processing unit 78 and displayed on the center display 2b via the image/sound output unit 51. The image shows an inquiry message 400, a YES button 402, and a NO button 404. The inquiry message 400 presents an inquiry like "Pull out of the lane and overtake?" for a determination as to whether to continue automatic driving. The mode of inquiry is not limited to the one described above.

The passenger checks the image displayed on the center display 2b and recognizes a situation where an inquiry to determine whether to continue automatic driving is made. When the passenger would like to continue automatic driving, the passenger touches the YES button 402 on the center display 2b, which is a touch-sensitive panel. When the passenger would not like to continue automatic driving and would like to stop, on the other hand, the passenger touches the NO button 404 on the center display 2b. These actions are sensed by the touch-sensitive panel. The actions are not limited to the ones described above, and one of the first manipulation unit 4a through the third manipulation unit 4c of FIG. 2 may be used. FIG. 5B will be described later, and reference is made back to FIG. 4.

The former action is a manipulation to continue automatic driving in response to the inquiry provided from the alert device 2, and the latter action is a manipulation to discontinue automatic driving in response to the inquiry provided from the alert device 2. The manipulation signal input unit 50 receives a response signal for the manipulation in response. The response signal is included in the aforementioned manipulation signal. When the manipulation signal input unit 50 receives the response signal, the manipulation signal input unit 50 notifies the inquiry processing unit 78 of the reception of the response signal. When the notification received from the manipulation signal input unit 50 indicates the reception of the response signal for the manipulation in response for continuation of automatic driving, the inquiry processing unit 78 directs the command processing unit 80 to generate a command.

When the notification received from the manipulation signal input unit 50 indicates the reception of the response signal for the manipulation in response indicating discontinuation of automatic driving, on the other hand, the inquiry processing unit 78 terminates the process. Further, when the manipulation signal input unit 50 does not receive a response signal for a predetermined period of time since the manipulation signal input unit 50 outputs the inquiry, the inquiry processing unit 78 terminates the process. In these situations, the automatic driving control device 30 stops the vehicle 100 even if the process is terminated.

When the command processing unit 80 is directed by the inquiry processing unit 78 to generate a command, i.e., when the manipulation in response for continuation of automatic driving is received by the input device 4, the command processing unit 80 generates a command to ease lane-based restriction on continuation of automatic driving. The command output unit 55 outputs the command generated by the command processing unit 80 to the automatic driving control device 30. When the controller 31 of the automatic driving control device 30 receives the command, the controller 31 performs a process such as calculation of a possibility of collision, as described already. However, the controller 31 determines a driving behavior without comparing the width necessary for travel 320 and the first lane space distance 330. The action of the vehicle 100 performed when the width necessary for travel 320 and the first lane space distance 330 are not compared is shown in FIG. 6A.

Figure 6A:
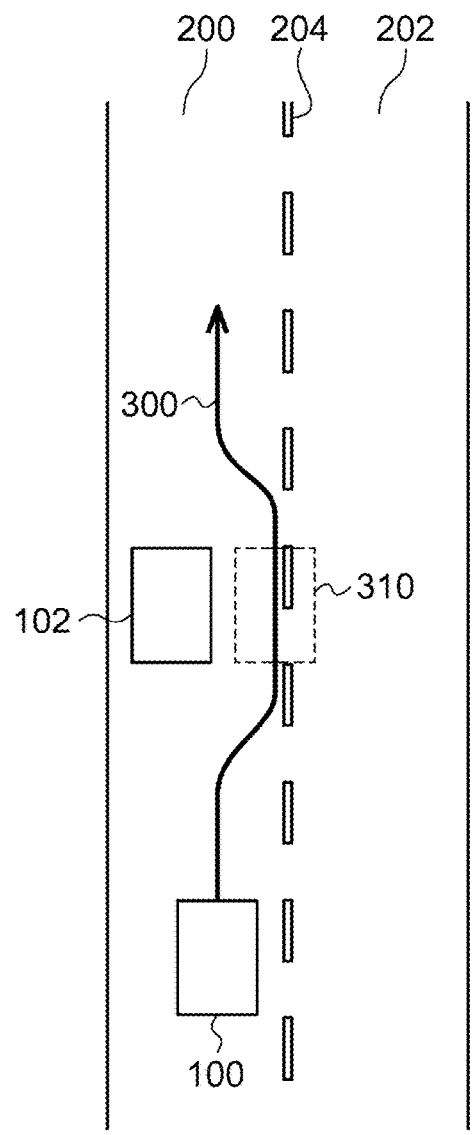
FIGS. 6A and 6B show the vehicle of FIG. 1 traveling.
Figure 6B:
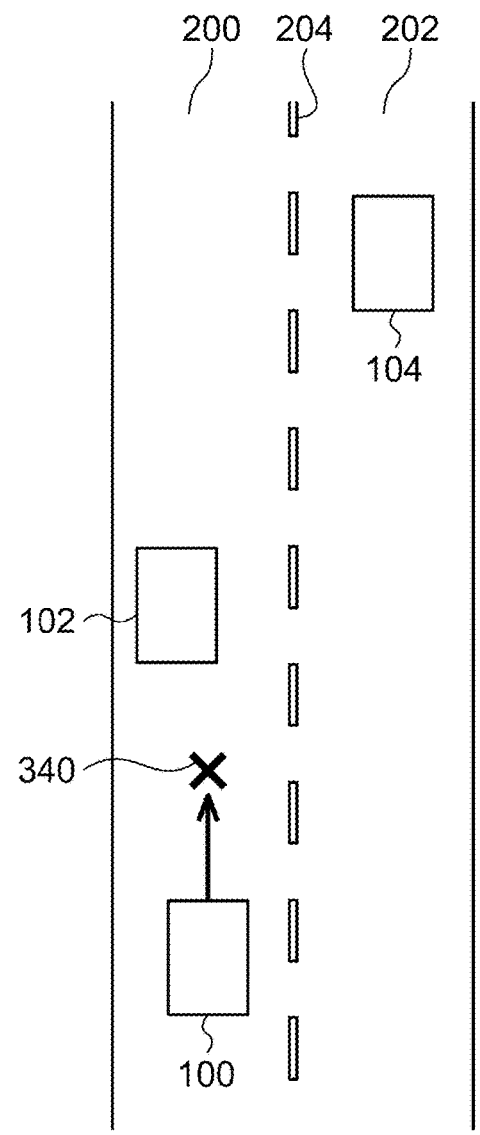

FIGS. 6A-6B show the vehicle 100 traveling. The first lane 200, the second lane 202, the compartment line 204, the vehicle 100, and the parked vehicle 102 are as described with reference to FIG. 3B. Referring to FIG. 6A, the virtual vehicle 310 pulls out to the second lane 202 if the vehicle 100 travels along the avoidance path 300. Since the width necessary for travel 320 and the first lane space distance 330 are not compared, however, the automatic driving control device 30 performs automatic driving along the avoidance path 300, causing the vehicle to pull out to the second lane 202, provided that there are no oncoming vehicles on the second lane 202. Meanwhile, FIG. 6B shows a process performed when the manipulation in response for discontinuation of automatic driving is performed or when the response signal is not received. The automatic driving control device 30 stops the vehicle 100 at a stop position 340 before the parked vehicle 102. Reference is made back to FIG. 4.

When the controller 31 of the automatic driving control device 30 performs automatic driving by excluding the comparison between the width necessary for travel 320 and the first lane space distance 330, the controller 31 outputs behavior information to the driving assistance device 40, indicating that the command is executed or the fact that command continues to be executed to. The behavior information input unit 54 of the driving assistance device 40 receives the behavior information. When the behavior information input unit 54 receives the behavior information, the command processing unit 80 generates an image for causing the passenger to recognize that the comparison between the width necessary for travel 320 and the first lane space distance 330 has been excluded in the automatic driving control device 30. FIG. 5B shows an image generated by the command processing unit 80 and displayed on the center display 2b. As illustrated, a message "The vehicle has pulled out of the lane and overtaking" is displayed. This represents alerting inside the vehicle that the command to ease lane-based restriction on continuation of automatic driving is output. The alert may be output outside the vehicle. Reference is made back to FIG. 4.

After the command output unit 55 outputs the command to ease lane-based restriction on continuation of automatic driving and until the driving behavior of pulling out to the second lane 202 as shown in FIG. 3B is completed, the determination unit 76 continues to determine whether the first lane space distance 330 is equal to or smaller than the width necessary for travel 320 by continuing the above-mentioned process. In this case, the determination unit 76 outputs a result of determination to the command processing unit 80.

The command processing unit 80 receives the result of determination from the determination unit 76. When the result of determination shows that the first lane space distance 330 is no longer equal to or smaller than the width necessary for travel 320, the command processing unit 80 generates a command for lane-based restriction on continuation of automatic driving. This represents a situation in which the driving behavior of pulling out to the second lane 202 is completed. The command output unit 55 outputs the command for lane-based restriction on continuation of automatic driving to the automatic driving control device 30. The controller 31 of the automatic driving control device 30 performs automatic driving while comparing the width necessary for travel 320 and the first lane space distance 330.

It has been hitherto assumed that the obstacle is the parked vehicle 102. A similar process may be performed even when the obstacle is a leading motorcycle or bicycle. Exemplary alternative processes will be described below with reference to FIGS. 7A-7B and FIG. 8. FIGS. 7A-7B show an outline of an alternative process according to the embodiment. FIG. 7A shows a first lane 200, a second lane 202, a lane line 206, and an oncoming lane 208. In the case described already, the first lane 200 and the second lane 202 have opposite directions of travel. In this case, however, the first lane 200 and the second lane 202 have the same direction of travel. In other words, the first lane 200 is a driving lane and the second lane 202 is an overtaking lane.

The boundary between the first lane 200 and the second lane 202 is the lane line 206. The oncoming lane 208 has a direction of travel opposite to that of the first lane 200 and the second lane 202.

The controller 31 of the automatic driving control device 30 performs a process similar to the process described already. The first lane space distance 330 is derived as a distance between the side surface of the parked vehicle 102 toward the lane line 206 and the lane line 206 that defines the end of the first lane 200. Meanwhile, like the controller 31, the determination unit 76 compares with width necessary for travel 320 on the avoidance path 300 and the first lane space distance 330. When the first lane space distance 330 is larger than the width necessary for travel 320, the determination unit 76 determines to continue automatic driving along the avoidance path 300 as similarly described above.

When the first lane space distance 330 is equal to or smaller than the width necessary for travel 320, on the other hand, the determination unit 76 checks the presence of a further vehicle located beside or behind the vehicle 100 by referring to the detected information. The further vehicle is a vehicle about to overtake the vehicle 100 and is illustrated as an overtaking vehicle 106 in FIG. 7A. In the absence of the overtaking vehicle 106, the determination unit 76 directs the inquiry processing unit 78 to make an inquiry. In the presence of the overtaking vehicle 106, however, the process is terminated to stop the vehicle 100. In other words, the alert device 2 provides inquiry information to inquire the passenger to determine whether to automatic driving when the first lane space distance 330 is equal to or smaller than the width necessary for travel 320 and when the overtaking vehicle 106 approaching from behind or beside the vehicle 100 is not present.

FIG. 7B shows a road 250. However, the compartment line 204 or the lane line 206 is not provided on the road 205 so that the first lane 200 and the second lane 202 are not provided. The automatic driving control device 30 and the determination unit 76 recognize that the first lane 200 and the second lane 202 are not provided on the road 250 by referring to the map information. When the compartment line 204 or the lane line 206 is not provided on the road 250, the automatic driving control device 30 and the determination unit 76 set a virtual boundary 252 at a position substantially having the width of the road 250 to define the end of the lane. Further, the virtual boundary 252 divides the road 250 into a first virtual lane 254 and a second virtual lane 256. The automatic driving control device 30 and the determination unit 76 perform a process similar to the process described already by using the first virtual lane 254 instead of the first lane 200 and using the virtual boundary 252 instead of the compartment line 204 or the lane line 206.

Figure 8:
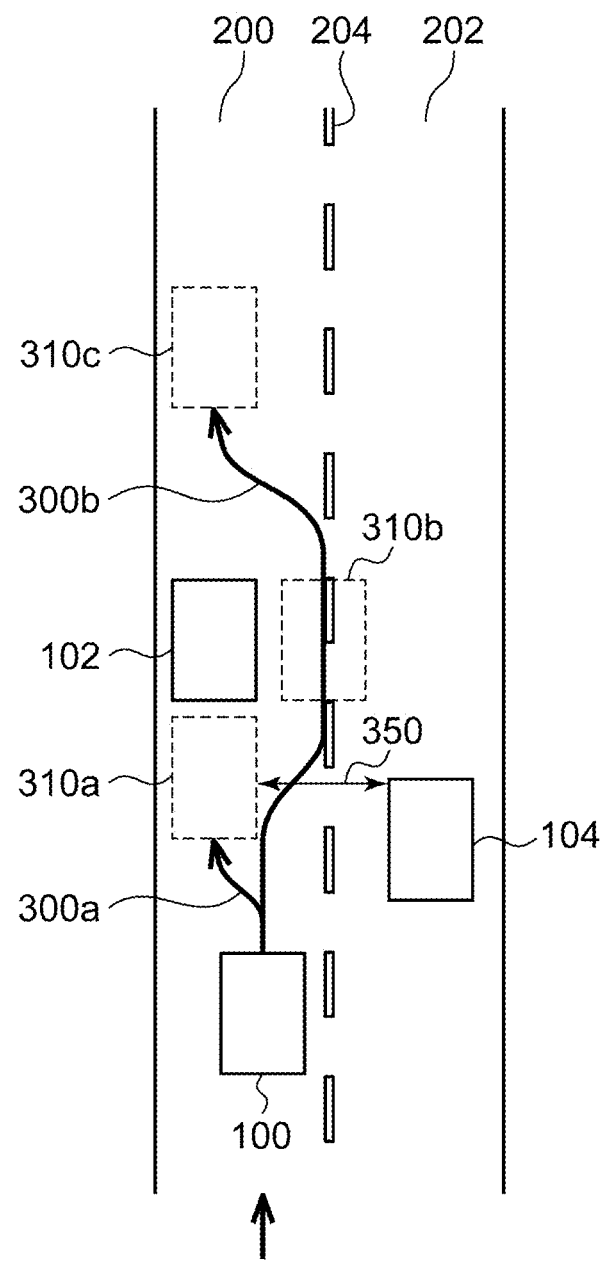
FIG. 8 shows an outline of a further alternative process according to the embodiment.

FIG. 8 shows an outline of a further alternative process according to the embodiment. The first lane 200, the second lane 202, the compartment line 204, the vehicle 100, and the parked vehicle 102 are as described with reference to FIG. 3B. Meanwhile, an oncoming vehicle 104 is parked on the second lane 202. In this case, it is assumed that an emergency vehicle (not shown) is traveling behind the vehicle 100. The wireless device 8 of the vehicle 100 receives a radio signal transmitted from the emergency vehicle. The radio signal includes position information, speed information, and direction of travel of the emergency vehicle. The wireless device 8 outputs the information as data to the driving assistance device 40. The communication IF 56 of the driving assistance device 40 receives the data from the wireless device 8 and outputs the data to the controller 41 and the automatic driving control device 30. The automatic driving control device recognizes the approach of the emergency vehicle by referring to the received data. The automatic driving control device 30 generates a first avoidance path 300a to make way for the emergency vehicle and causes the vehicle to travel along the first avoidance path 300a and stop. The vehicle 100 caused to stop is illustrated as a first virtual vehicle 310a.

The first virtual vehicle 310a is also generated by the avoidance path generation unit 74 of the controller 41. Further, the avoidance path generation unit 74 also generates a second avoidance path 300b for causing the vehicle to avoid the parked vehicle 102 and stop. Generation of the second avoidance path 300b may be similar to generation of the avoidance path 300, and a description thereof is omitted here. The virtual vehicle 310 in embodiment 1 corresponds to the second virtual vehicle 310b, and the stopped vehicle 100 that moves along the second avoidance path 300b and comes to a top is illustrated as a third virtual vehicle 310c. The avoidance path generation unit 74 outputs the first avoidance path 300a and the second avoidance path 300b to the determination unit 76.

The determination unit 76 has recognized the presence of the oncoming vehicle 104 by referring to the detected information. The determination unit 76 derives an emergency vehicle space distance 350 that is a distance between the first virtual vehicle 310a traveling along the first avoidance path 300a and the oncoming vehicle 104. The determination unit 76 compares the width necessary for travel in the presence of an emergency vehicle and the emergency vehicle space distance 350. The width necessary for travel in the presence of an emergency vehicle is stored in advance and may have a value identical to or different from the value of the width necessary for travel 320 described above. When the emergency vehicle space distance 350 is larger than the width necessary for travel, the determination unit 76 determines to stop the vehicle 100 and terminates the process. Thus, the automatic driving control device 30 causes the vehicle 100 to travel along the first avoidance path 300a and causes the vehicle 100 to stop at the position of the first virtual vehicle 310a.

When the emergency vehicle space distance 350 is equal to or smaller than the width necessary for travel, the determination unit 76 compares the width necessary for travel 320 on the second avoidance path 300b and the first lane space distance 330 as in embodiment 1. For clarity of the drawings, illustration of the width necessary for travel 320 and the first lane space distance 330 is omitted. When the first lane space distance 330 is larger than the width necessary for travel 320, the determination unit 76 determines to cause the vehicle 100 to travel along the second avoidance path 300b and cause the vehicle 100 to stop at the position of the third virtual vehicle 310c. The determination unit 76 directs the command processing unit 80 to generate a command to travel along the second avoidance path 300b. The command processing unit 80 generates a command to travel along the second avoidance path 300b in accordance with an instruction from the determination unit 76. The command output unit 55 outputs the command generated by the command processing unit 80 to the automatic driving control device 30. When the controller 31 of the automatic driving control device 30 receives the command, the controller 31 controls the vehicle 100 to travel along the second avoidance path 300b.

When the first lane space distance 330 is equal to or smaller than the width necessary for travel 320, on the other hand, the determination unit 76 directs the inquiry processing unit 78 to make an inquiry. When the inquiry processing unit 78 is directed by the determination unit 76 to make an inquiry, the inquiry processing unit 78 performs a process of inquiring the passenger to determine whether to travel along the second avoidance path 300b instead of the process in embodiment 1 of inquiring the passenger to determine whether to continue automatic driving. The process in this case may be similar to that of embodiment 1, and a description thereof is omitted. The passenger selects whether to travel along the second avoidance path 300b and stop or to travel along the first avoidance path 300a and stop.

Figure 9:
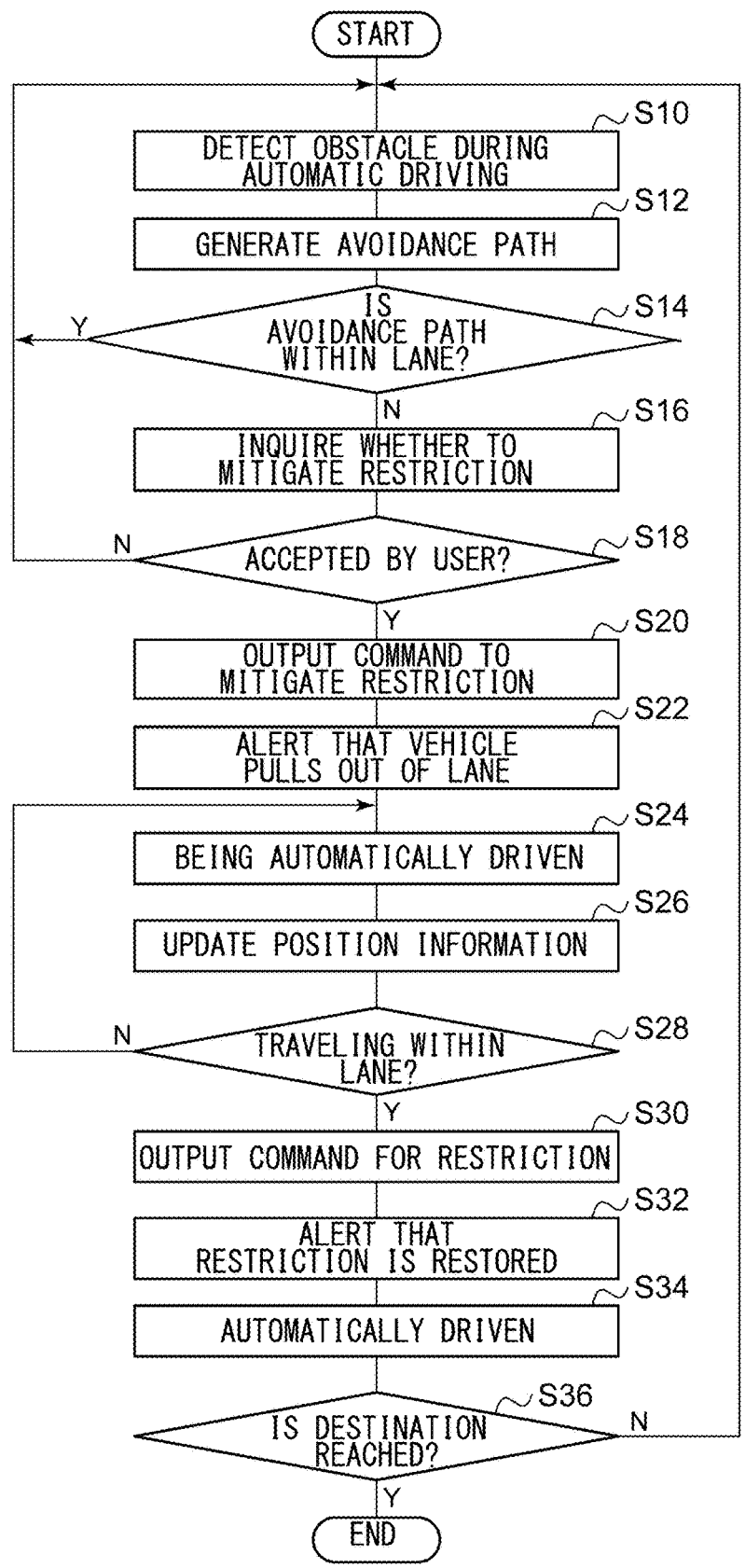
FIG. 9 is a flowchart showing a sequence of steps performed by the controller of FIG. 4 to give an instruction.

A description will be given of the operation of the driving assistance device 40 configured as described above. FIG. 9 is a flowchart showing a sequence of steps performed by the controller 41 to give an instruction. The obstacle detection unit 72 detects an obstacle while the vehicle is being automatically driven (S10). The avoidance path generation unit 74 generates the avoidance path 300 (S12). When the avoidance path 300 is within the lane (Y in S14), control is returned to step 10. When the avoidance path 300 is not within the lane (N in S14), the inquiry processing unit 78 inquires whether to ease restriction via the alert device 2 (S16). When the user does not accept (N in S18), control is returned to step 10. When the user accepts (Y in S18), the command processing unit 80 and the command output unit 55 output a command to ease restriction (S20). The alert device 2 alerts that the vehicle pulls out of the lane (S22).

The automatic driving control device 30 is performing automatic driving (S24), and the position information acquisition unit 21 updates the position information (S26). When the vehicle is not traveling within the lane (N in S28), control is returned to step 24. When the vehicle is traveling within the lane (Y in S28), the command processing unit 80 and the command output unit 55 output a command for restriction (S30). The alert device 2 alerts that restriction is restored (S32). The automatic driving control device 30 performs automatic driving (S34). When the destination is not reached (N in S36), control is returned to step 10. When the destination is reached (Y in S36), the process is terminated.

According to the embodiment, an inquiry to determine whether to continue automatic driving is made when the first lane space distance is equal to or smaller than the width necessary for travel. Therefore, the intent of the passenger can be confirmed, and information visually obtained by the passenger can be reflected in the driving behavior so that the vehicle can be driven more smoothly. Further, information visually obtained by the passenger is reflected in the driving behavior. Therefore, the safety is secured even when the vehicle pulls out of the lane. Further, easing of lane-based restriction on continuation of automatic driving is designated when the passenger's manipulation to continue automatic driving is received in response. Therefore, the vehicle can travel depending on a situation when an obstacle is present. Further, the vehicle is prevented from becoming unable to adapt to a real world situation and being in a deadlock when the vehicle pulls out to the oncoming lane to avoid a parked car or to overtake a leading motorcycle or bicycle. Further, the vehicle is prevented from becoming unable to adapt to a real world situation and being in a deadlock. Therefore, smooth automatic driving can be realized.

Further, the distance to the compartment line is used as the first lane space distance. Therefore, a determination can be made as to whether the vehicle has pulled out of the lane. Further, the virtual boundary defining the end of the lane is set at a position substantially having the width of the road. Therefore, the process can be performed even if the compartment line is not provided on the road. Further, an inquiry is made when the first lane space distance is equal to or smaller than the width necessary for travel and when a further vehicle is not present. Therefore, an overtake is prevented from occurring in the presence of an overtaking vehicle. Further, an overtake is prevented from occurring in the presence of an overtaking vehicle. Therefore, the safety is secured. Further, lane-based restriction on continuation of automatic driving is designated when the first lane space distance is no longer equal to or smaller than the width necessary for travel. Therefore, collision with an obstacle is inhibited from occurring.

The embodiments according to the present invention have been described in detail with reference to the drawings, but the functions of the devices and processing units described above can be implemented by computer programs. A computer that implements the functions described above by means of programs is provided with: an input device such as a keyboard, mouse, and touch pad; an output device such as a display and speaker; a central processing unit (CPU); a storage device such as a ROM, RAM, hard disk device, and solid state drive (SSD); a reader that reads information from a recording medium such as a digital versatile disk read only memory (DVD-ROM) and USB memory; a network card that performs communication via a network. The components are connected by a bus.

The reader reads a program from a recording medium storing the program and causes the storage device to store the read program. Alternatively, the network card may communicate with a server device connected to the network and cause the storage device to store the program downloaded from the server device and implementing the functions of the devices. The CPU copies the program stored in the storage device to the RAM, and the functions of the above devices are implemented by sequentially reading commands included in the program from the RAM and executing the commands. Further, obstacles may encompass other road users. For example, a motorcycle (two-wheeled vehicle) and a bicycle (ridden by a person) may be dealt with as further vehicles, and a person pushing a bicycle and a person riding a skateboard may be dealt with as pedestrians.

One embodiment of the present invention is summarized below. A driving assistance system according to an embodiment of the present disclosure is a driving assistance system for supporting a vehicle, the vehicle including a sensor for detecting an obstacle to the vehicle and an automatic driving control device for calculating an avoidance path for avoiding the obstacle detected by the sensor, controlling automatic driving of the vehicle by referring to the avoidance path calculated, and allowing automatic driving to continue by avoiding the obstacle within a lane, the driving assistance system including: an alert device that provides alert information for inquiring a passenger to determine whether to continue automatic driving when a distance between the obstacle and an end of the lane is equal to or larger than a width necessary for travel based on a width of the vehicle; an input device that receives a passenger's manipulation to continue automatic driving in response the inquiry provided from the alert device; and a command output unit that outputs a command to ease lane-based restriction on continuation of automatic driving to the automatic driving control device when the manipulation in response is received by the input device.

According to the embodiment, easing of lane-based restriction on continuation of automatic driving is designated when the distance between the obstacle and the end of the lane is equal to or smaller than the width necessary for travel and when the passenger's manipulation to continue automatic driving is received in response. Therefore, the vehicle can travel in accordance with a situation when an obstacle is present.

The end of the lane may be a compartment line provided on a road. In this case, a determination as to whether the vehicle has pulled out of the lane can be made because the distance to the compartment lane is used.

The end of the lane may be set at a position substantially having a width of a road when a compartment line is not provided on the road. In this case, the end of the lane is set at a position substantially halving the width of the road. Therefore, the process can be performed even if a compartment line is not provided on the road.

The alert device may provide inquiry information for inquiring the passenger to determine whether to continue automatic driving when the distance between the obstacle and the end of the lane is equal to or larger than the width necessary for travel and when a further vehicle approaching from behind or beside the vehicle is not present. In this case, an inquiry is made when the distance between the obstacle and the end of the lane is equal to or smaller than the width necessary for travel and when a further vehicle is not present. Therefore, an overtake is prevented from occurring in the presence of an overtaking vehicle.

When the distance between the obstacle and the end of the lane is no longer equal to or larger than the width necessary for travel after outputting the command to ease lane-based restriction on continuation of automatic driving, the command output unit may output a command to maintain lane-based restriction on continuation of automatic driving to the automatic driving control device. In this case, lane-based restriction on continuation of automatic driving is designated when the distance between the obstacle and the end of the lane is no longer equal to or smaller than the width necessary for travel. Therefore, collision with an obstacle is inhibited from occurring.

The alert device may alert inside or outside the vehicle that a command to ease lane-based restriction on continuation of automatic driving is output. In this case, an alert is provided to indicate that a command to ease lane-based restriction on continuation of automatic driving is output. Therefore, the situation can be made known.

Another embodiment of the present disclosure relates to a driving assistance device. The device is a driving assistance device for supporting a vehicle, the vehicle including an automatic driving control device for calculating an avoidance path for avoiding an obstacle detected by a sensor for detecting an obstacle to the vehicle, controlling automatic driving of the vehicle by referring to the avoidance path calculated, and allowing automatic driving to continue by avoiding the obstacle within a lane, the driving assistance system including: an inquiry output unit that provides, to an alert device, inquiry information for inquiring a passenger to determine whether to continue automatic driving when a distance between the obstacle and an end of the lane is equal to or larger than a width necessary for travel based on a width of the vehicle; a manipulation signal input unit in which a response signal for a passenger's manipulation to continue automatic driving is input in response to the inquiry provided by the alert device; and a command output unit that outputs a command to ease lane-based restriction on continuation of automatic driving to the automatic driving control device when the response signal is input to the manipulation signal input unit.

Still another embodiment of the present disclosure relates to a driving assistance method. The method is a driving assistance method adapted for a driving assistance device for supporting a vehicle, the vehicle including an automatic driving control device for calculating an avoidance path for avoiding an obstacle detected by a sensor for detecting an obstacle to the vehicle, controlling automatic driving of the vehicle by referring to the avoidance path calculated, and allowing automatic driving to continue by avoiding the obstacle within a lane, the driving assistance method including: providing, to an alert device, inquiry information for inquiring a passenger to determine whether to continue automatic driving when a distance between the obstacle and an end of the lane is equal to or larger than a width necessary for travel based on a width of the vehicle; inputting a response signal for a passenger's manipulation to continue automatic driving in response to the inquiry provided by the alert device; and outputting a command to ease lane-based restriction on continuation of automatic driving to the automatic driving control device when the response signal is input.

Described above is an explanation of the present invention based on the embodiment. The embodiment is intended to be illustrative only and it will be understood by those skilled in the art that various modifications to constituting elements and processes could be developed and that such modifications are also within the scope of the present invention.

The description of the embodiment deals with a case in which the vehicle 100 is traveling on the left-hand side. Alternatively, however, the vehicle 100 may travel on the right-hand side. According to this variation, the scope of application can be expanded.

Further, the description of the embodiment assumes a passenger in the vehicle. Alternatively, however, the control staff, instead of a passenger, may take over the control of an unmanned, automatically driven vehicle via a network. In that case, the alert device may comprise a display at the control site, etc., and the input device may comprise an input button at the control site, etc.

While various embodiments have been described herein above, it is to be appreciated that various changes in form and detail may be made without departing from the spirit and scope of the invention(s) presently or hereafter claimed.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driving assistance system for supporting a vehicle, the vehicle including a sensor for detecting an obstacle in a first lane where the vehicle is traveling and an automatic driving controller for calculating an avoidance path for avoiding the obstacle detected by the sensor, controlling automatic driving of the vehicle by referring to the avoidance path calculated, and allowing automatic driving to continue by avoiding the obstacle, the driving assistance system comprising:

an alert device that provides inquiry information for inquiring a passenger to determine whether to continue automatic driving beyond an edge of the first lane and without changing the vehicle to a second lane next to the first lane in order to avoid the obstacle when a distance between the obstacle and the edge of the first lane is equal to or smaller than a width for travel based on a width of the vehicle, and does not provide inquiry information when the distance between the obstacle and the edge of the first lane is larger than the width for travel based on the width of the vehicle;

an input device that receives a passenger's first manipulation indicating to continue automatic driving beyond the edge of the first lane in response to the inquiry information provided from the alert device; and a command output that outputs a first command, to the automatic driving controller, to continue automatic driving beyond the edge of the first lane and without changing the vehicle to the second lane in response to the first manipulation being received by the input device.

2. The driving assistance system according to claim 1, wherein the edge of the first lane is a compartment line provided on a road.

3. The driving assistance system according to claim 1, wherein the edge of the first lane is set at a position substantially having a width of a road when a compartment line is not provided on the road.

4. The driving assistance system according to claim 1, wherein the alert device provides inquiry information for inquiring the passenger to determine whether to continue automatic driving beyond the edge of the first lane and without changing the vehicle to the second lane, in a case where the distance between the obstacle and the edge of the first lane is equal to or smaller than the width for travel and a further vehicle approaching from behind or beside the vehicle is not present.

5. The driving assistance system according to claim 1, wherein when the distance between the obstacle and the edge of the first lane is no longer equal to or smaller than the width for travel after the first command is output, the command output outputs a second command to maintain lane-based restriction on continuation of automatic driving to the automatic driving controller.

6. The driving assistance system according to claim 2, wherein when the distance between the obstacle and the edge of the first lane is no longer equal to or smaller than the width for travel after the first command is output, the command output outputs a second command to maintain lane-based restriction on continuation of automatic driving to the automatic driving controller.

7. The driving assistance system according to claim 3, wherein when the distance between the obstacle and the edge of the first lane is no longer equal to or smaller than the width for travel after the first command is output, the command output outputs a second command to maintain lane-based restriction on continuation of automatic driving to the automatic driving controller.

8. The driving assistance system according to claim 4, wherein when the distance between the obstacle and the edge of the first lane is no longer equal to or smaller than the width for travel after the first command is output, the command output outputs a second command to maintain lane-based restriction on continuation of automatic driving to the automatic driving controller.

9. The driving assistance system according to claim 1, wherein the alert device alerts inside or outside the vehicle that the first command is output.

10. The driving assistance system according to claim 2, wherein the alert device alerts inside or outside the vehicle that the first command is output.

11. The driving assistance system according to claim 3, wherein the alert device alerts inside or outside the vehicle that the first command is output.

12. The driving assistance system according to claim 4, wherein the alert device alerts inside or outside the vehicle that the first command is output.

13. The driving assistance system according to claim 5, wherein the alert device alerts inside or outside the vehicle that the first command is output.

14. The driving assistance system according to claim 6, wherein the alert device alerts inside or outside the vehicle that the first command is output.

15. The driving assistance system according to claim 7, wherein the alert device alerts inside or outside the vehicle that the first command is output.

16. The driving assistance system according to claim 8, wherein the alert device alerts inside or outside the vehicle that the first command is output.

17. The driving assistance system according to claim 1, wherein, when the distance between the obstacle and the edge of the first lane is larger than the width for travel based on the width of the vehicle, the alert device does not provide inquiry information and the automatic driving controller allows automatic driving to continue.

18. A driving assistance device for supporting a vehicle, the vehicle including a sensor for detecting an obstacle in a first lane where the vehicle is traveling and an automatic driving controller for calculating an avoidance path for avoiding the obstacle detected by the sensor, controlling automatic driving of the vehicle by referring to the avoidance path calculated, and allowing automatic driving to continue by avoiding the obstacle, the driving assistance device comprising:

a processor; and a storage coupled to the processor, wherein using the storage, the processor, in operation:

provides, to an alert device, inquiry information for inquiring a passenger to determine whether to continue automatic driving beyond an edge of the first lane and without changing the vehicle to a second lane next to the first lane in order to avoid the obstacle when a distance between the obstacle and the edge of the first lane is equal to or smaller than a width for travel based on a width of the vehicle, and does not provide inquiry information when the distance between the obstacle and the edge of the first lane is larger than the width for travel based on the width of the vehicle;

receives a response signal for a passenger's manipulation indicating to continue automatic driving beyond the edge of the first lane in response to the inquiry information provided by the alert device; and outputs a command, to the automatic driving controller, to continue automatic driving beyond the edge of the first lane and without changing the vehicle to the second lane in response to the response signal being received.

19. A driving assistance method adapted for a driving assistance device for supporting a vehicle, the vehicle including a sensor for detecting an obstacle in a first lane where the vehicle is traveling and an automatic driving controller for calculating an avoidance path for avoiding the obstacle detected by the sensor, controlling automatic driving of the vehicle by referring to the avoidance path calculated, and allowing automatic driving to continue by avoiding the obstacle, the driving assistance method comprising:

providing, to an alert device, inquiry information for inquiring a passenger to determine whether to continue automatic driving beyond an edge of the first lane and without changing the vehicle to a second lane next to the first lane in order to avoid the obstacle when a distance between the obstacle and the edge of the first lane is equal to or smaller than a width for travel based on a width of the vehicle, and not providing inquiry information when the distance between the obstacle and the edge of the first lane is larger than the width for travel based on the width of the vehicle;

inputting a response signal for a passenger's manipulation indicating to continue automatic driving beyond the edge of the first lane in response to the inquiry information provided by the alert device; and outputting a command, to the automatic driving controller, to continue automatic driving beyond the edge of the first lane and without changing the vehicle to the second lane in response to the response signal being input.

\* \* \* \* \*